United States Patent [19]

Vickers et al.

[11] Patent Number: 4,802,241
[45] Date of Patent: Jan. 31, 1989

[54] PAGER AND ADJUSTABLE CLIP

[75] Inventors: Michael W. Vickers, Lees' Summit, Md.; David W. Stubbs, Kansas City, Mo.

[73] Assignee: Maxcom Electronics, Inc., Kansas City, Mo.

[21] Appl. No.: 933,118

[22] Filed: Nov. 21, 1986

[51] Int. Cl.$^4$ .................. H04B 1/08; A45F 5/02
[52] U.S. Cl. .................... 455/344; 455/351; 455/348; 224/162; 224/196; 224/197
[58] Field of Search ........... 455/351, 346, 344, 347; 340/825.44, 311.1; 24/3 R, 3 G, 3 H, 3 J, 3 L, 67.7, 487, 489, 499, 500, 509, 510, 511, 508, 704; 224/163, 196, 197, 199, 224, 252, 269

[56] References Cited

U.S. PATENT DOCUMENTS

| | | |
|---|---|---|
| 2,397,780 | 4/1946 | Emde . |
| 2,551,515 | 5/1951 | Tschirf . |
| 2,894,119 | 7/1959 | Stenger . |
| 3,808,642 | 5/1974 | Nation . |
| 4,083,481 | 4/1978 | Selinko .................... 455/351 |
| 4,100,653 | 7/1978 | Sensabaugh . |
| 4,534,063 | 8/1985 | Krumin et al. ............. 224/199 |
| 4,536,925 | 8/1985 | Boothe et al. ............. 455/351 |
| 4,635,836 | 1/1987 | Mooney et al. . |
| 4,654,631 | 3/1987 | Kurobait et al. ........... 224/269 |

Primary Examiner—Robert L. Grifin
Assistant Examiner—Curtis A. Kuntz
Attorney, Agent, or Firm—Gene W. Arant; Don C. Lawrence

[57] ABSTRACT

A personal electronic communication apparatus for carrying by an individual including, a housing having an indicator panel for displaying received information characters or the status of the apparatus located on the front face of the housing. The housing has a normal right-side-up orientation in which all of the information characters being displayed may be read in a normal fashion. A support device includes normally parallel front and back plates, with a hinge mechanism pivotally joining the upper portions of the plates and is adapted to be vertically inserted around a belt or to clip on to a pocket flap, with the hinge mechanism projection upward. The front plate has means for fastening it to the back face of the housing in such an orientation that the indicator panel is normally up-side-down with respect to the individual carrying the apparatus, that is, the indicator panel faces away from the person carring the apparatus. The hinge mechanism permits the front plate to be pivoted upward to a generally horizontal position in which the front plate is generally perpendicular to the back plate, such that the indicator panel can then be read in its normal right-side-up orientation by the person carrying the apparatus. Spring means is associated with the hinge mechanism for urging the front plate to return to its normal position generally parallel to the back plate.

3 Claims, 1 Drawing Sheet

U.S. Patent    Jan. 31, 1989    4,802,241
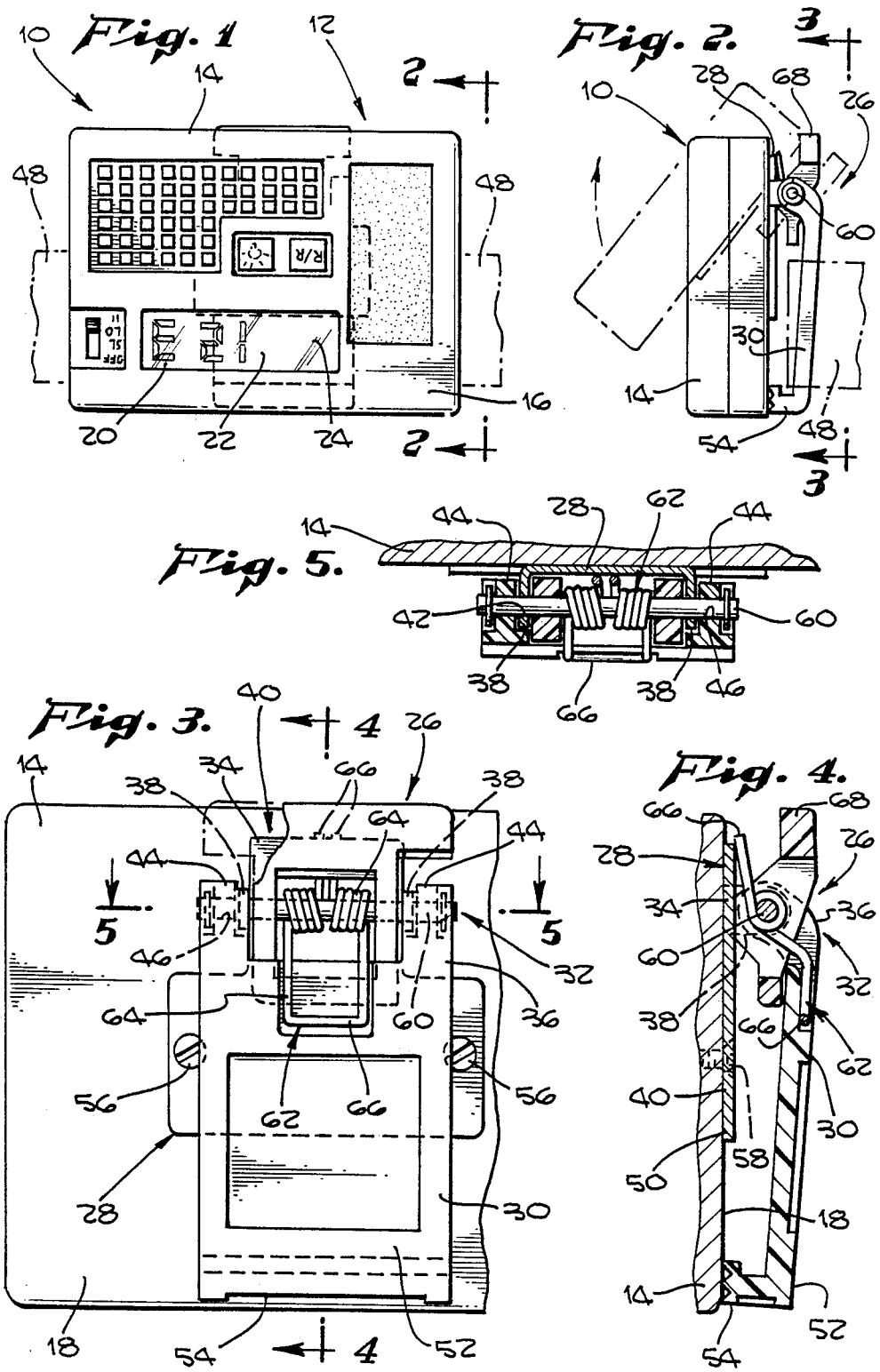

PAGER AND ADJUSTABLE CLIP

BACKGROUND OF THE INVENTION

1. Field of the Invention

This invention relates in general to personal electronic communication apparatus, and, more particularly, to an adjustable clip for use with a personal electronic communication apparatus that enables the apparatus to be more easily and efficiently used by an individual.

2. Description of the Related Art

Personal portable electronic communications have become widespread and a virtual necessity in today's modern society. This is because there is an unquestionable need in our fast moving modern society for an individual both to have access to others and to be readily accessible by others. Such ready access via electronic communications networks has caused more and more individuals to carry personal electronic communications apparatus such as beepers, pagers and mobile telephones or radios known as handheld transmitters.

To insure that the usually expensive personally carried communications apparatus is not lost, but securely held, a clip is normally attached to the apparatus and fastened around a belt or to a pocket flap. In this position, however, an individual is normally viewing the indicator panels of the apparatus upside-down. In other words, the apparatus' indicators showing the information that the apparatus has received is also upside-down to the wearer of the apparatus. Therefore, in order for the individual to properly read the captured information on the indicator panels, he must detach the apparatus and turn it around. When an individual removes the apparatus from its fastened position on the belt or pocket, however, he must be careful to hold the apparatus to prevent dropping it and causing damage or losing the captured information.

Currently available clips or fasteners for use with pagers and the like, fail to provide an answer to this problem of reading the received information without subjecting the apparatus to removal from its secured position and possible damage from falling. This possibility of damage is also increased due to the fact that current clips or fasteners are difficult to remove from their secured position on a belt or pocket, as the elements forming the clip or fastener are normally biased closed and offer the user no quick or sure method of removal without subjecting the apparatus to a precarious position or possible damage from falling.

SUMMARY OF THE INVENTION

It is an object of the present invention to provide a personal communication apparatus for carrying by an individual that is easy to use without having to remove the apparatus from its secured carrying position.

It is another object of the present invention to provide a personal communication apparatus that has a fastener or clip that permits it to be securely carried by an individual, and Yet permit the apparatus to be quickly and easily removed if so desired.

In general, the invention is directed toward an improved personal electronic communication apparatus comprising, in combination, an electronics communication device including a box-like housing having a front face and a back face. Radio receiver circuitry is located within the housing for receiving information transmitted to the apparatus. An indicator panel, for displaying the received information or the status of the apparatus, is located on the front face of the housing.

The indicator panel has therein an electronic indicating device for indicating a row of information characters. The housing has a normal right side up orientation in which all of the information characters being displayed may be read in a normal fashion.

A support device includes normally parallel front and back plates, with a hinge mechanism pivotally joining the upper portions of the plates.

The back plate is adapted to be vertically inserted around a belt or to clip on to a pocket flap, with the hinge mechanism projecting upward.

The front plate has means for fastening it to the back face of the housing in such an orientation that the indicator panel is normally up-side-down with respect to the individual carrying the apparatus, that is, the indicating device faces away from the person carrying the apparatus.

The hinge mechanism permits the front plate to be pivoted upward to a generally horizontal position in which the front plate is generally perpendicular to the back plate, such that the indicator panel can then be read in its normal right-side-up orientation by the person carrying the apparatus.

Spring means is associated with the hinge mechanism for urging the front plate to return to its normal position generally parallel to the back plate.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

BRIEF DESCRIPTION OF THE DRAWINGS

FIG. 1 is a front view of a personal electronic communication apparatus constructed in accordance with the invention herein;

FIG. 2 is a view taken along the line 2—2 of FIG. 1 in the direction of the arrows shown;

FIG. 3 is a rear view of a personal electronic communication apparatus constructed in accordance with the invention herein similar to that of FIG. 1;

FIG. 4 is a view taken along the line 413 4 of FIG. 3 in the direction of the arrows shown; and FIG. 5 is a view taken along the line 5—5 of FIG. 3 in the direction of the arrows shown.

DESCRIPTION OF THE PREFERRED EMBODIMENTS

In general, the invention is directed toward a personal electronic communication apparatus 10 comprising, in combination a communication device 12 including a box-like housing 14 having a front face 16 and a back face 18. Radio receiver circuitry, not illustrated, is located within the housing 14 for receiving information transmitted to the device 12. An indicator panel 20, for displaying the received information, or the status of the device 12, is located on the front face 16 of the housing 14.

The indicator panel 20 has therein an electronic indicating device 22 for indicating a row of information characters 24. Electronic indicating device 22 may include a series of light emitting diodes or a liquid crystal display or any other status indicating device such as a light bulb, etc., that can be selectively controlled to convey information.

The housing 14 has a normal right-side-up orientation in which all of the information characters 24 being displayed on electronic indicating device 22 may be read in a normal fashion.

A support device 26 includes normally parallel front and back plates 28 and 30 respectively, with a hinge mechanism 32 pivotally joining the upper portions 34 and 36 of the plates 28 and 30 respectively.

Front plate 28 is generally T-shaped and has an in-turned ear 38 formed on each side of the leg 40 of front plate 28. The ears 38 are generally parallel to one another and have aligned openings 42.

The rectangular plastic back plate 30 is adapted to be vertically disposed and has a pair of in-turned ears 44 on its upper end 36. The ears 44 are generally parallel to one another and have aligned openings 46.

Back plate 30 is also adapted to be vertically inserted around a belt 48 or to clip to a pocket flap, not illustrated, with the hinge mechanism 32 projecting upward. The back plate 30 extends below the lower extremity 50 of the front plate 28 and has on its lower end 52 the forwardly extending flange 54 for retainingly engaging the apparatus 10 on the belt 48 or a pocket flap.

The front and back plates 28 and 30 respectively, are normally disposed in generally parallel relation to one another with the ears 38 of the front plate 28 being disposed between the ears 44 of the back plate 30.

The front plate 28 has attachment means 56, such as screws inserted through the holes 58 in front plate 28 and into back face 18, for fastening support device 26 to the back face 18 of the housing 14 in such an orientation that the indicator panel 20 is normally up-side-down with respect to the individual carrying the apparatus 10, that is, the indicating device 22 faces away from the person carrying the apparatus 10.

Hinge mechanism 32 includes a metal hinge pin 60 extending through all of the ears 38 and 44 for supporting the front and back plates 28 and 30 in pivotal relation to each other.

The hinge mechanism 32 permits the front plate 28 to be pivoted upward to a generally horizontal position, as indicated in FIG. 2, in which the front plate 28 is generally perpendicular to the back plate 30, such that the indicator panel 20 can then be read by the person carrying the apparatus 10 in its normal right-side-up orientation without removing the apparatus 10 from its secured position around belt 48.

Spring means 62 is associated with the hinge mechanism 32 for urging the front plate 28 to return to its normal position generally parallel to the back plate 30. Specifically, a spring 64 is carried on the hinge pin 60 and has projecting ends 66 engaging respective sides of the front and back plates 28 and 30 for restraining the pivotal movement thereof.

The support device 26 also includes an intermediate plate 68 of a generally rectangular configuration and made of material, such as plastic or metal. Intermediate plate 68 is disposed between the ears 38 of the front plate 28 and has a transverse opening which receives the hinge pin 60. The intermediate plate 68 extends above both of the front and back plates 28 and 30 for limiting the relative pivotal movement thereof.

The invention described above is, of course, susceptible to many variations, modifications and changes, all of which are within the skill of the art. It should be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

What is claimed is:

1. A personal communication device, comprising:
   a housing having front and rear faces and means for: receiving information in the form of remotely transmitted electromagnetic signals, converting the signals into a visible array of readable characters, and displaying the array upsidedown on the front face of the housing; and
   a clip mechanism for supporting the housing from a belt or pocket of a wearer in a normally vertical position, with the front face facing outwardly and the rear face facing inwardly, and for permitting the housing to be easily swung pivotally upward through about ninety degrees to a horizontal position such that the front face of the device may be viewed in a right-side-up orientation by the wearer, or for permitting the device to be easily detached from the belt or pocket, the clip comprising:
   a front plate having a central leg portion with an in-turned ear on each side of said leg portion, said ears being parallel and having aligned openings;
   means for removably attaching said front plate to said rear face of said housing so that its ears are near the upper extremity thereof;
   a substantially rectangular back plate adapted to be vertically disposed, and having a pair of in-turned ears on its upper end, said ears being parallel and having aligned openings;
   said two plates being normally disposed in generally parallel relation with said ears thereof being interengaged and all of said openings being aligned;
   a hinge pin extending through all of said ear openings for supporting said two plates in pivotal relation to each other;
   said back plate being adapted to be inserted downward along the back side of a belt or pocket and having on its lower end a forwardly extending flange for then retaining it in engagement with such belt or pocket;
   a metal spring carried on said hinge pin and having projecting ends engaging respective ones of said plates for urging the lower ends of said plates together; and
   an intermediate plate of a generally rectangular configuration, said intermediate plate being disposed between said ears of said front and back plates and having a transverse opening which receives said hinge pin for pivotally supporting said intermediate plate thereon;
   said intermediate plate having an upper end which extends above both of said front and back plates and a lower end which extends a substantial distance below said hinge pin, so that when said housing is swung pivotally upward, its pivotal movement is limited by the upper end of said intermediate plate, and when said flange of said back plate is to be disengaged from said belt or pocket, the upper end of said intermediate plate may be grasped and propelled toward the upper end of the housing to thereby cause the lower end of said intermediate plate to open said back plate against the force of said spring.

2. The device of claim 1, wherein said lower end of said back plate extends below the lowermost end of said front plate, so that said flange of said back plate may bear directly on said rear face of said housing.

3. The device of claim 1, wherein said front plate is made of metal, said back plate and its flange are integrally formed of plastic material, and said intermediate plate is also made of plastic material.

* * * * *